(12) United States Patent
Richardson (10) Patent No.: US 8,991,116 B2
(45) Date of Patent: Mar. 31, 2015

(54) ROOF SOLAR PANEL FOR CONVENTIONAL SLOPING ROOF AND SHINGLE INTEGRATION

(76) Inventor: Robert Richardson, Aylmer (CA)

( * ) Notice: Subject to any disclaimer, the term of this patent is extended or adjusted under 35 U.S.C. 154(b) by 0 days.

(21) Appl. No.: 14/116,637

(22) PCT Filed: May 10, 2012

(86) PCT No.: PCT/CA2012/050305
§ 371 (c)(1),
(2), (4) Date: Nov. 8, 2013

(87) PCT Pub. No.: WO2012/151700
PCT Pub. Date: Nov. 15, 2012

(65) Prior Publication Data
US 2014/0083028 A1    Mar. 27, 2014

(30) Foreign Application Priority Data

May 10, 2011  (CA) ..................................... 2739766

(51) Int. Cl.
*E04D 13/18*    (2014.01)
*E04D 13/14*    (2006.01)
(Continued)

(52) U.S. Cl.
CPC ............... *F24J 2/5245* (2013.01); *F24J 2/045* (2013.01); *F24J 2/4609* (2013.01);
(Continued)

(58) Field of Classification Search
USPC ............. 52/173.3, 745.21, 58, 59, 60, 61, 62, 52/302.6
See application file for complete search history.

(56) References Cited

U.S. PATENT DOCUMENTS 4,244,355 A    1/1981    Stout
4,273,106 A    6/1981    Gould
(Continued)

FOREIGN PATENT DOCUMENTS

CA    1092462 A    12/1980
CA    2095827 A1    5/1992
(Continued)

OTHER PUBLICATIONS

International Search Report issued on Jul. 26, 2012 for PCT International Patent Application No. PCT/CA2012/050305.

*Primary Examiner* — Basil Katcheves
*Assistant Examiner* — Rodney Mintz
(74) *Attorney, Agent, or Firm* — Heslin Rothenberg Farley & Mesiti P.C.; Victor A. Cardona, Esq.

(57) ABSTRACT

There is provided an improved roof solar panel, embodying an array of photovoltaic cells mounted on conventional modular roof sheathing, that can be readily and easily installed onto a conventional sloped roof and integrated into conventional roof shingles. Such panel includes a shingle mounting surface on a perimeter area of the sheathing, a flash strip mounted inside such shingle mounting surface and, when installed on the roof, a retainer trim for securing shingles mounted on said shingle mounting surface, while mounting to the flash strip and sealing to a perimeter of a rigid transparent protective sheet over the array. The retainer trim also serves to provide means for securing the panel onto roof trusses. Integration with the conventional roof shingling provides, inter alia, an attractive low profile with improved water shedding and wind resistance properties. There is also an intermediate roof solar panel, for installation on a roof so as to provide the aforementioned improved roof solar panel. The invention also relates to a kit comprising, inter alia, said intermediate roof solar panel, and to a method of installing said intermediate roof solar panel.

17 Claims, 9 Drawing Sheets

(51) Int. Cl.
*E04B 7/00* (2006.01)
*F24J 2/52* (2006.01)
*F24J 2/04* (2006.01)
*F24J 2/46* (2006.01)
*H01L 31/048* (2014.01)
*F16B 5/06* (2006.01)
*F16B 11/00* (2006.01)

(52) U.S. Cl.
CPC .... *H01L 31/0482* (2013.01); *F24J 2002/4667* (2013.01); *F24J 2002/4676* (2013.01); *F24J 2002/5281* (2013.01); *F16B 5/0635* (2013.01); *F16B 11/006* (2013.01); *Y02E 10/50* (2013.01); *Y02E 10/44* (2013.01); *Y02B 10/20* (2013.01); *Y02B 10/12* (2013.01); *Y02E 10/47* (2013.01)
USPC ............ 52/173.3; 52/58; 52/302.6; 52/745.21

(56) References Cited

U.S. PATENT DOCUMENTS

| | | | | |
|---|---|---|---|---|
| 4,336,413 | A * | 6/1982 | Tourneux | 136/251 |
| 4,392,484 | A | 7/1983 | Aloi et al. | |
| 4,636,577 | A * | 1/1987 | Peterpaul | 136/206 |
| 5,338,369 | A | 8/1994 | Rawlings | |
| 6,063,996 | A | 5/2000 | Takada et al. | |
| 6,082,060 | A * | 7/2000 | Bauer et al. | 52/173.3 |
| 7,642,449 | B2 | 1/2010 | Korman et al. | |
| 7,997,027 | B1 * | 8/2011 | Mischo | 47/65.9 |
| 8,153,700 | B2 * | 4/2012 | Stearns et al. | 521/58 |
| 8,156,697 | B2 * | 4/2012 | Miros et al. | 52/173.3 |
| 8,181,402 | B2 | 5/2012 | Tsuzuki et al. | |
| 8,191,320 | B2 * | 6/2012 | Mittan et al. | 52/173.3 |
| 8,215,071 | B2 * | 7/2012 | Lenox | 52/173.3 |
| 8,261,496 | B2 * | 9/2012 | Sahlin et al. | 52/173.3 |
| 8,397,448 | B2 * | 3/2013 | Brown et al. | 52/173.3 |
| 8,418,419 | B1 | 4/2013 | Aseere et al. | |
| 8,424,256 | B2 * | 4/2013 | Cook et al. | 52/173.3 |
| 8,434,276 | B2 * | 5/2013 | Sahlin et al. | 52/173.3 |
| 8,549,793 | B1 * | 10/2013 | Gens et al. | 52/58 |
| 8,646,228 | B2 * | 2/2014 | Jenkins | 52/173.3 |
| 8,677,702 | B2 * | 3/2014 | Jenkins | 52/173.3 |
| 8,793,941 | B2 * | 8/2014 | Bosler et al. | 52/173.3 |
| 8,833,005 | B1 * | 9/2014 | Croft et al. | 52/173.3 |
| 2004/0187909 | A1 * | 9/2004 | Sato et al. | 136/251 |
| 2005/0086873 | A1 * | 4/2005 | Mares | 52/58 |
| 2005/0166955 | A1 * | 8/2005 | Nath et al. | 136/251 |
| 2007/0199561 | A1 * | 8/2007 | Soucy | 126/623 |
| 2008/0190047 | A1 * | 8/2008 | Allen | 52/173.3 |
| 2008/0302407 | A1 * | 12/2008 | Kobayashi | 136/251 |
| 2008/0313976 | A1 * | 12/2008 | Allen | 52/173.1 |
| 2009/0044850 | A1 * | 2/2009 | Kimberley | 136/244 |
| 2009/0178350 | A1 * | 7/2009 | Kalkanoglu et al. | 52/173.3 |
| 2010/0219304 | A1 * | 9/2010 | Miros et al. | 248/125.8 |
| 2010/0242381 | A1 * | 9/2010 | Jenkins | 52/173.3 |
| 2010/0243023 | A1 * | 9/2010 | Patton et al. | 136/244 |
| 2010/0282318 | A1 * | 11/2010 | Kalkanoglu et al. | 136/259 |
| 2010/0307074 | A1 * | 12/2010 | Stearns et al. | 52/173.1 |
| 2010/0313499 | A1 * | 12/2010 | Gangemi | 52/173.3 |
| 2010/0313501 | A1 * | 12/2010 | Gangemi | 52/173.3 |
| 2011/0056559 | A1 * | 3/2011 | Sahlin et al. | 136/259 |
| 2011/0088740 | A1 * | 4/2011 | Mittan et al. | 136/244 |
| 2011/0185652 | A1 * | 8/2011 | Lenox | 52/173.3 |
| 2011/0197524 | A1 * | 8/2011 | Sahlin et al. | 52/173.3 |
| 2011/0209422 | A1 * | 9/2011 | King et al. | 52/173.3 |
| 2011/0239555 | A1 * | 10/2011 | Cook et al. | 52/173.3 |
| 2011/0277402 | A1 * | 11/2011 | Schnitzer | 52/173.3 |
| 2011/0314753 | A1 * | 12/2011 | Farmer et al. | 52/173.3 |
| 2012/0060434 | A1 * | 3/2012 | Jacobs | 52/173.3 |
| 2012/0137600 | A1 * | 6/2012 | Jenkins | 52/173.3 |
| 2012/0186630 | A1 * | 7/2012 | Jenkins et al. | 136/251 |
| 2012/0198780 | A1 * | 8/2012 | Snowwhite | 52/173.3 |
| 2012/0210660 | A1 * | 8/2012 | Livsey et al. | 52/173.3 |
| 2012/0222725 | A1 * | 9/2012 | Albright et al. | 136/251 |
| 2012/0240490 | A1 * | 9/2012 | Gangemi | 52/173.3 |
| 2012/0260588 | A1 * | 10/2012 | Allen | 52/173.3 |
| 2013/0000230 | A1 * | 1/2013 | Sahlin et al. | 52/173.3 |
| 2013/0167455 | A1 * | 7/2013 | Jenkins et al. | 52/58 |
| 2014/0033625 | A1 * | 2/2014 | Jenkins et al. | 52/173.3 |
| 2014/0157694 | A1 * | 6/2014 | Jenkins | 52/173.3 |
| 2014/0173997 | A1 * | 6/2014 | Jenkins | 52/58 |

FOREIGN PATENT DOCUMENTS

| | | | |
|---|---|---|---|
| CA | 2091059 | A1 | 11/1992 |
| CA | 2131899 | C | 7/1994 |
| CA | 2120650 | C | 10/1994 |
| CA | 2574659 | A1 | 2/2006 |
| CA | 2617819 | A1 | 9/2008 |
| CA | 2691856 | A1 | 12/2008 |
| CA | 2693028 | A1 | 1/2009 |
| CA | 2718162 | A1 | 5/2009 |
| CA | 2711627 | A1 | 7/2009 |
| CA | 2751298 | A1 | 8/2010 |
| CA | 2703324 | A1 | 12/2010 |
| CA | 2767031 | A1 | 1/2011 |
| CA | 2780053 | A1 | 5/2011 |

* cited by examiner

STEP #9

STEP #8

STEP #7

STEP #11

STEP #10

ROOF SOLAR PANEL FOR CONVENTIONAL SLOPING ROOF AND SHINGLE INTEGRATION

CROSS REFERENCE TO RELATED APPLICATIONS

This application is a U.S. National Phase filing under 35 U.S.C. §371 of International Application PCT/CA2012/050305, filed May 10, 2012, and published as WO 2012/151700 on Nov. 15, 2012. PCT/CA2012/050305 claimed benefit of priority from Canadian Patent Application No. 2,739,766, filed May 10, 2011. The entire contents of each of the prior applications are incorporated herein by reference.

FIELD OF THE INVENTION

The present invention relates to an improved roof solar panel, embodying photovoltaic cells, that can be readily and easily installed into a conventional sloping roof and that integrates with a conventional shingle finish on the roof so as to provide, inter alia, an attractive low profile with improved water shedding and wind resistance properties. Further, the invention relates to an intermediate roof solar panel, for installation so as to provide the aforementioned improved roof solar panel. The invention also relates to a kit comprising, inter alia, said intermediate roof solar panel, and to a method of installing said intermediate roof solar panel.

BACKGROUND

Both non-structural and structural roof elements incorporating solar collectors such as an array of photovoltaic cells are well known. However, structural roof panels are generally of specialized and costly configuration and installation, often complex and/or heavy and requiring modification or replacement of existing conventional roof structures. The combination of non-structural substrates and solar panels is also well known as substitutes for roofing materials such as shingles and tiles, but such are also typically costly and requiring specialized installation. Solar panels for installation over existing roof components are also well known, but such pose undesirable profile and aesthetic factors, and challenges for mounting securely on the roof without compromising existing roof components or their function.

There is therefore a need for a low cost, easy to install roof solar panel offering highly secure integration into conventional roof structures and consequent functional and aesthetic advantages.

SUMMARY OF THE INVENTION

In a first aspect, the invention provides a modular roof solar panel installed on a sloping roof, the panel comprising modular roof sheathing having an upper surface and a sheathing perimeter. The sheathing perimeter has an underside mounted on adjacent roof trusses, a topside and a sheathing perimeter edge. There is a (base) flashing strip mounted on the topside of the sheathing perimeter, the flashing strip having inside and outside perimeter edges. The flashing strip is set back from the sheathing perimeter edge to provide a shingle mounting surface. Preferably this set back provides a shingle strip mounting surface around the sides and top of the sheathing perimeter of the panel. There is also an array of photovoltaic cells mounted on the upper surface, the array having an array perimeter inside the flashing strip inside perimeter edge. There is also a rigid, transparent protective sheet over the array, the protective sheet sealingly mounted on the flashing strip proximate to the flashing strip inside perimeter edge. There are a plurality of shingles sealingly secured on the shingle mounting surface and on a topside perimeter area of adjacent roof sheathing to which the shingles extend. There is a retainer trim comprising a mounting base and a retaining lip, the retainer trim mounted at its mounting base on a topside of the shingles over the shingle supporting surface and on a topside of the flashing strip outside where the protective sheet is mounted on the flashing strip. The retaining lip is sealed on a topside perimeter of the protective sheet.

Preferably the protective sheet comprises glass, low iron glass, or plexiglass. The protective sheet may be sealingly mounted onto the flashing strip With urethane and the retaining lip may be sealed by a silicone sealer to the topside perimeter of the protective sheet.

The retainer trim may further comprise fasteners securing the panel to a roof truss. The roof sheathing preferably comprises 4'×8' plywood. Preferably, the modular solar panel base is made of a non-flammable substitute (e.g. polypropylene base or covering) for conventional plywood.

Such base preferably is sized to span the roof trusses equally, similar to the normal roof sheathing process. Although the solar panel mounted on such base may be smaller in length based on panel sizing requirements. The flashing strip and retainer trim preferably are made of aluminum. Preferably roof shingles over adjacent roof sheathing abut the retainer trim.

Most preferably, the plurality of shingles secured on the shingle mounting surface are shingle strips, specifically on the shingle mounting surface that is on the sides and top areas of the sheathing perimeter. The shingle strips are preferably prepared from shingles by removal of part of the showing surface of a shingle.

In another aspect the invention provides an intermediate modular roof solar panel for completion upon installation on a sloping roof, the intermediate modular roof solar panel comprising modular roof sheathing having an upper surface and a sheathing perimeter. The sheathing perimeter has an underside mounted on adjacent roof trusses, a topside and a sheathing perimeter edge. A flashing strip is mounted on the topside of the sheathing perimeter, the flashing strip having inside and outside perimeter edges. The flashing strip outside perimeter edge is set back from the sheathing perimeter edge to provide a shingle mounting surface on the topside of the sheathing perimeter. An array of photovoltaic cells is mounted on the upper surface, such array having an array perimeter inside the flashing strip inside perimeter edge. There is also a rigid, transparent protective sheet over the array, the protective sheet sealingly mounted on the flashing strip proximate to the flashing strip inside perimeter edge.

In yet a further aspect there is provided a kit of parts for installation as a roof solar panel on a sloping roof, the kit comprising the foregoing intermediate modular roof solar panel and retainer trim for assembly and completion of the panel upon installation on a roof. The retainer trim comprises a mounting base and a retaining lip. The mounting base is adapted for mounting on a topside of a shingle (when said shingle is mounted on said shingle mounting surface during installation of the panel on a roof), and for mounting on a topside of said flashing strip over said flashing strip outside perimeter and outside where the protective sheet is mounted on said flashing strip (also during installation of the panel on a roof). The retaining lip is adapted for sealing on a topside perimeter of the protective sheet.

The invention also provides a method of installing the aforementioned intermediate modular roof solar panel onto a sloping roof. The method comprises selecting an area of roof trusses for mounting of the intermediate modular roof solar panel, installing roof sheathing on roof trusses around a perimeter of the area, mounting the intermediate roof solar panel onto the area of roof trusses, securing roof shingles over the shingle supporting surface of the topside of the sheathing perimeter and adjacent roof sheathing, and sealingly mounting a retainer trim, at a mounting base thereof, on the flashing strip outside a perimeter of the protective sheet and on the roof shingles over the shingle mounting surface of the topside of the sheathing perimeter, while sealing a retaining lip of the retainer trim onto a topside perimeter of the protective sheet.

SUMMARY OF THE DRAWINGS

In drawings which illustrate preferred embodiments of the invention.

DETAILED DESCRIPTION OF THE INVENTION

There is disclosed herein a prefabricated intermediate roof solar panel that is configured to be installed onto conventional roof trusses, a method of installing such roof solar panel and the resulting finished roof solar panel after such installation. The intermediate roof solar panel is comprised of a substrate which is preferably either conventional (structural) roof sheathing such as 4'×8' plywood, or a non-flammable substitute. The sheathing supports a conventional photovoltaic cell array sealed onto much of its upper surface and covered by a rigid, transparent protective sheet such as glass, plexiglass, or most preferably low iron glass. Such protective sheet is for protecting the array from the usual physical stresses caused by weather (wind, water, snow etc.) and atmospheric debris, while allowing sunlight to pass through to the surface of the photovoltaic array for conversion into electricity. A flashing strip is mounted around a perimeter area of the sheathing and the protective sheet is mounted at a perimeter of such sheet onto an inner perimeter of the flashing strip. The flashing strip is set back from a perimeter edge of the sheathing, leaving bare a sufficiently sized topside perimeter area adjacent the perimeter edge of the sheathing, i.e. for accommodating shingle integration in the installation process on a roof.

During installation on a roof, after the intermediate roof solar panel has been secured to trusses, a preferably single shingle layer (preferably a shingle strip prepared from a shingle by cutting away a show surface of the shingle) is secured around the top and sides of the aforementioned topside perimeter area of the sheathing, i.e. on said topside perimeter area adjacent the perimeter edge of the sheathing. The shingle layer is also sized so that it overlaps onto adjacent regular roof sheathing. Along the lower side of the roof solar panel, shingles are installed so that their upper edges butt up against the outside (i.e. lower) edge of the flashing strip, subject to cutting them preferably so as to avoid overlap of the shingle strips at the sides of the roof solar panel near and at the bottom thereof. Sealer (e.g. silicone) is applied over the shingle strips along the sides and top of the roof solar panel, the upper ends of the regular shingles along the bottom of the roof solar panel, and the flashing strip outside where the protective sheet is mounted, after which the retainer trim is then mounted. The retainer trim has a suitable shape for such mounting and also for sealing onto the topside of the protective sheet (discussed further, below, and as shown in a preferred embodiment in the figures), over where the protective sheet is mounted onto the flashing strip. After installation of the retainer trim, conventional shingling of the roof to points abutting the retainer trim at the sides and top, and under the shingle along the bottom of the roof solar panel is performed.

It is noted that the inventive solar roof panel has the advantage of allowing a solar panel to be quickly and easily installed on a conventional existing roof, or on a new roof construction without the usual time consuming aspects of adapting a solar panel for installation over existing conventional roof panels and shingles. Also, use of familiar existing materials requires less training, skill and cost for installation compared to other systems and is less costly to manufacture (particularly as the preferred sheathing is a typical material used for roofing work with the addition of a non-flammable material for the cell array).

Figure 1:
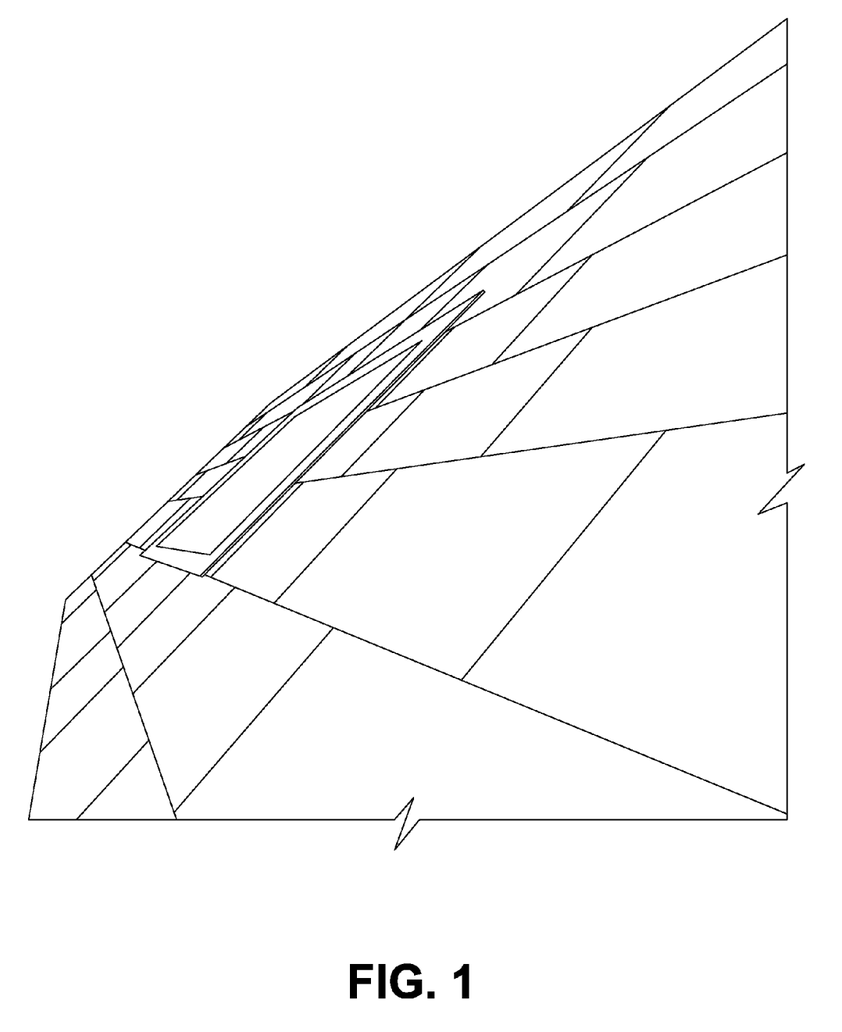
FIG. 1 is a side perspective view of the roof solar panel according to the invention, installed on a roof.
Figure 1A:
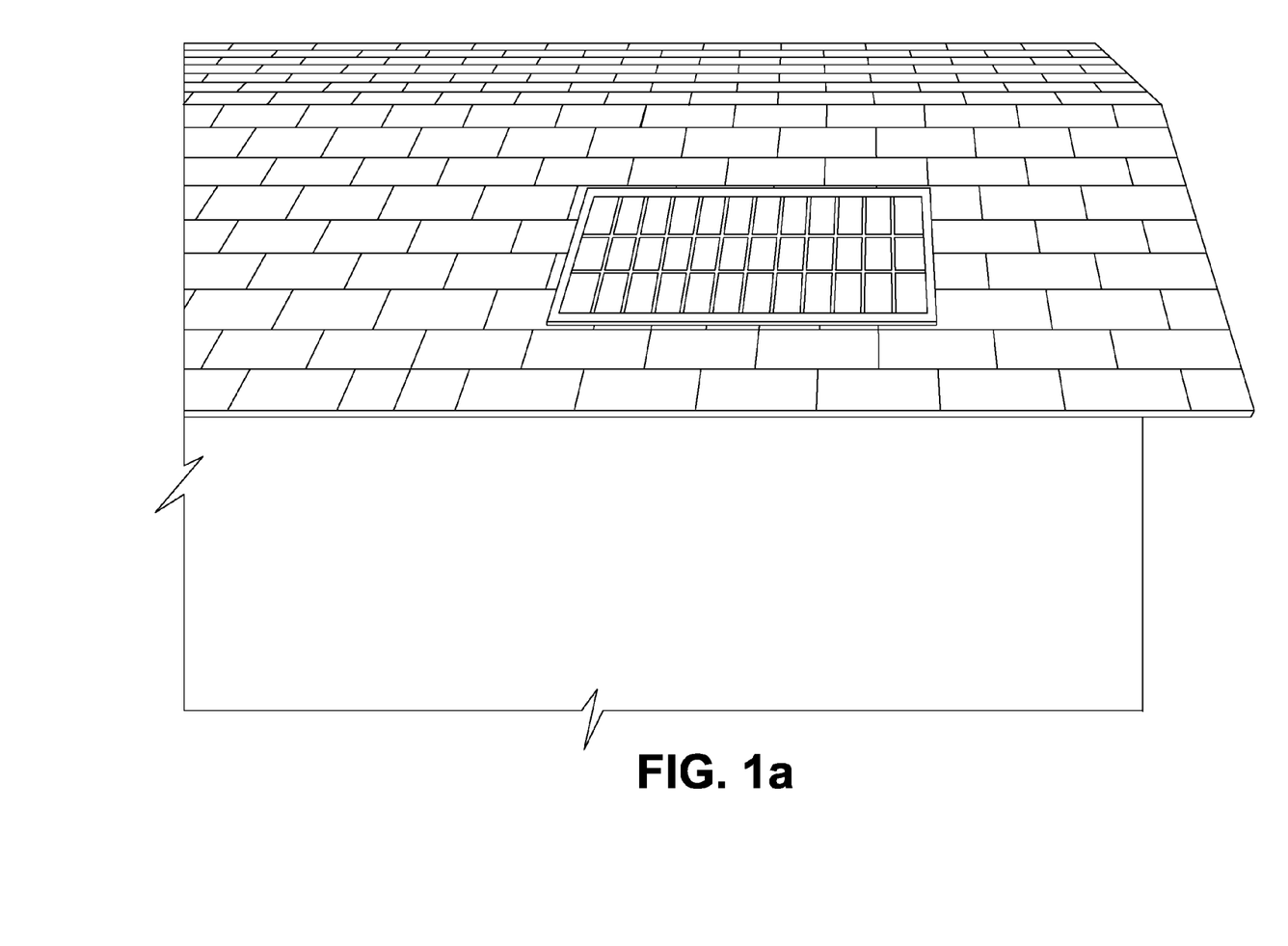
FIG. 1a is a front perspective view of a roof solar panel according to the invention, installed on a roof.

The present invention further does not require mounting brackets and is integrated with the shingles so as to provide a low profile on the roof (see FIG. 1). Thus, this provides superior water shedding and is less affected by wind compared to higher or more complex profiles. This further provides a more aesthetically pleasing appearance.

Further, by using, in the preferred configuration, conventional (non-flammable) roof sheathing as the base for the roof solar panel, significant weight reductions are achieved compared to prior art systems and solar panels, thereby avoiding any need to apply reinforcing structures to the trusses.

The preferred use of urethane as an adhesive allows for a more flexible control over expansion and contraction between the construction materials in the roof solar panel. The intermediate roof solar panel, its installation on a roof and the installed roof solar panel will now be described with reference to the Figures.

FIG. 1 illustrates the inventive roof solar panel installed on a roof. The perspective view of FIG. 1 conveys the low profile of the roof solar panel as well as its integration into the surrounding conventional shingles. While this illustrates a single roof solar panel so installed, two or more inventive roof solar panels may be installed on the roof either separated from or, more preferably, abutting each other.

Figure 2:
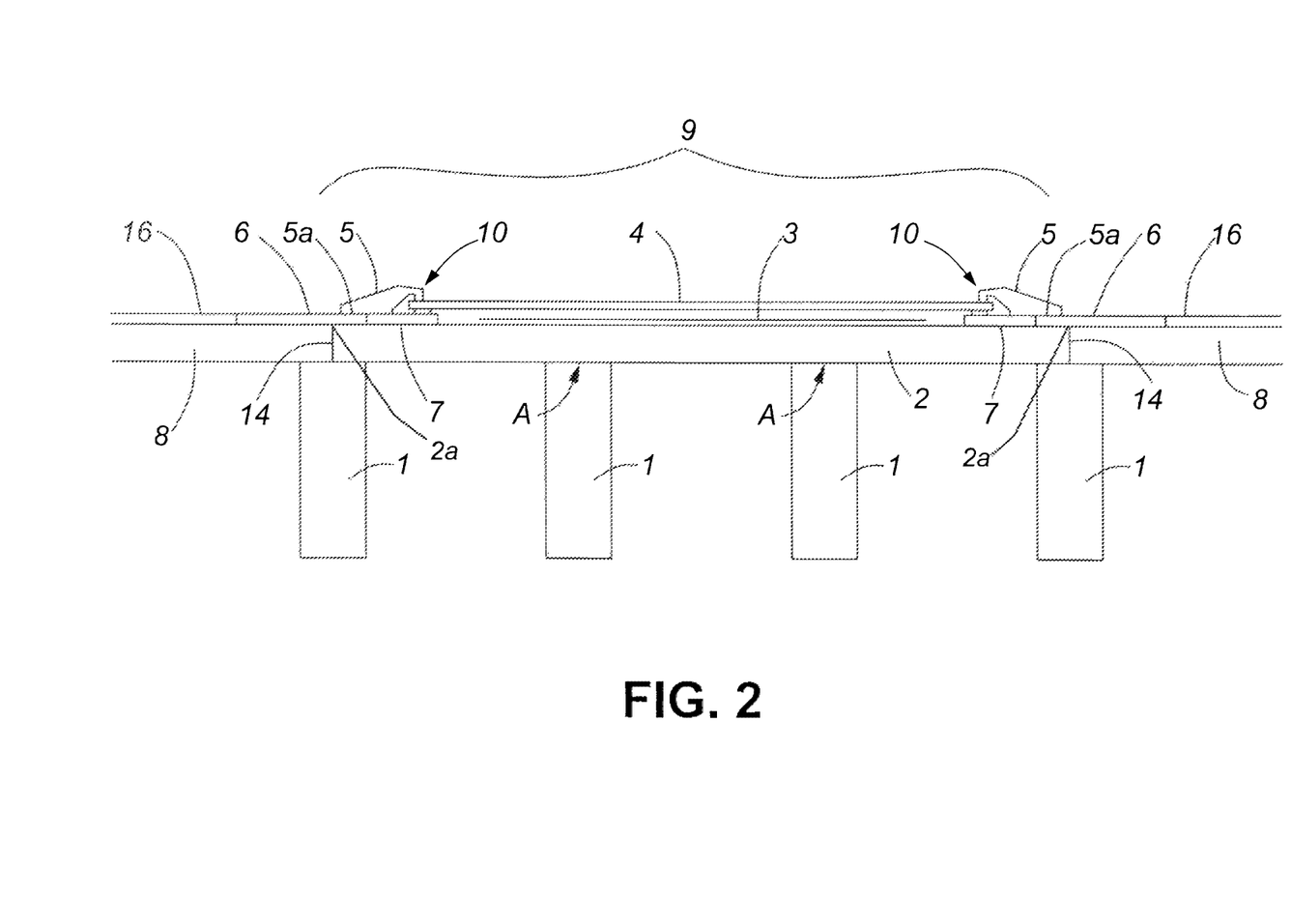
FIG. 2 is a cross section view from side to side of the inventive roof solar panel installed on a roof.
Figure 2A:
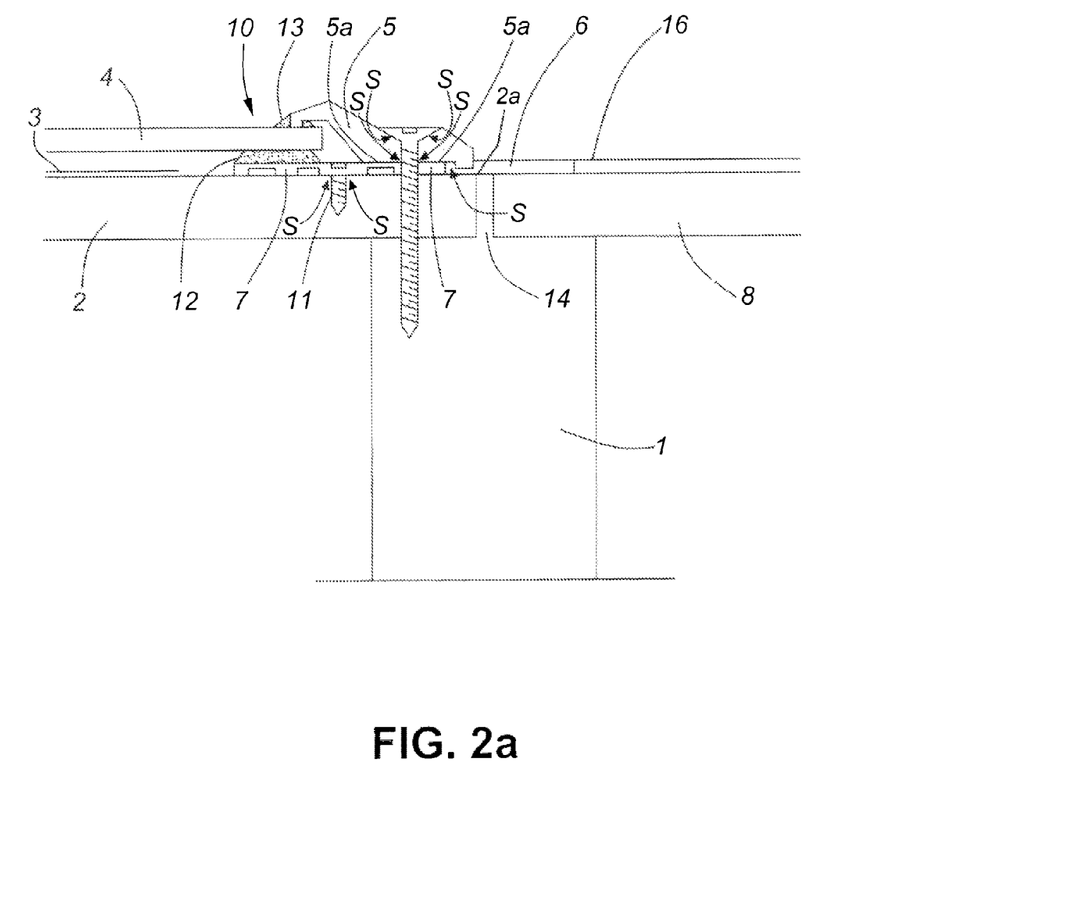
FIG. 2a is a close-up, cross section view of the right side of the view of FIG. 2.

FIGS. 2 and 2a illustrate the layers and components of the inventive roof solar panel when installed on a roof. Conventional sheathing 8 and the inventive roof solar panel 9 are shown mounted on roof trusses 1 using adhesive, such as silicone, at locations "A", Sheathing 2 (e.g. 3/8" thick plywood with non-flammable coating, or a substitute non-flammable board known in the art) of roof solar panel 9 has photovoltaic cell array 3 (having silicon photovoltaic cells and tag wires) mounted on the upper surface of the sheathing 2. Preferably, such array is triple sealed to the sheathing using urethane and silicone sealer, Wiring of the array may be led through an opening (not shown) through the sheathing to the area under the roof. Rigid transparent protective sheet 4 (e.g. low iron glass, 3mm (0.118 inches) to 4mm (0.157 inches) thick, depending on the size of the solar panel) is mounted over the array 3 at mounting locations 10. Flashing strips 7 are mounted on the sheathing 2, e.g. using silicone sealant and/or fasteners such as screw 11, at a distance set back from the perimeter edge of the sheathing 2a, preferably such distance being from about 5 to about 30mm (0.197 to 1.181inches), more preferably from about 5 to about 15 mm (0.197 to 0.591 inches) (such preferences depending on preferred dimensions selected for retainer trim 5 and flashing strip 7). The flashing strips 7 provide a base for mounting of said sheet 4 at locations 10. Mounting adhesive 12 preferably is urethane, and sealant 13 preferably is silicone. Shingle strips 6, which preferably are cut from conventional shingles, are mounted during installation of the intermediate roof solar panel on the roof, preferably in a single layer on the sides and top of the roof solar panel and over the abutting areas of sheathing 8 and 2. Regular shingles 16 are shown schematically, butting up to the edge of retainer trim 5. Along the sides and top of the roof solar panel, retainer trim 5 is mounted (during installation of the intermediate roof solar panel on the roof), on the shingle strips 6 and adjacent flashing strips at mounting base 5a. Along the bottom area of the roof solar panel, retainer trim 5 is mounted (also during such installation on the roof) on a roof shingle and adjacent flashing strip (see FIG. 8a). Preferably, retainer trim 5 is so mounted using sealing adhesive, preferably silicone. Also preferably, the retainer trim 5 has fastener openings for installing fasteners, preferably screws, through the retainer trim 5, the underlying flashing strip 7 and sheathing 2 and into the truss 1 (as in FIG. 2a), Preferably sealer ("S") is applied where shown.

Figure 3:
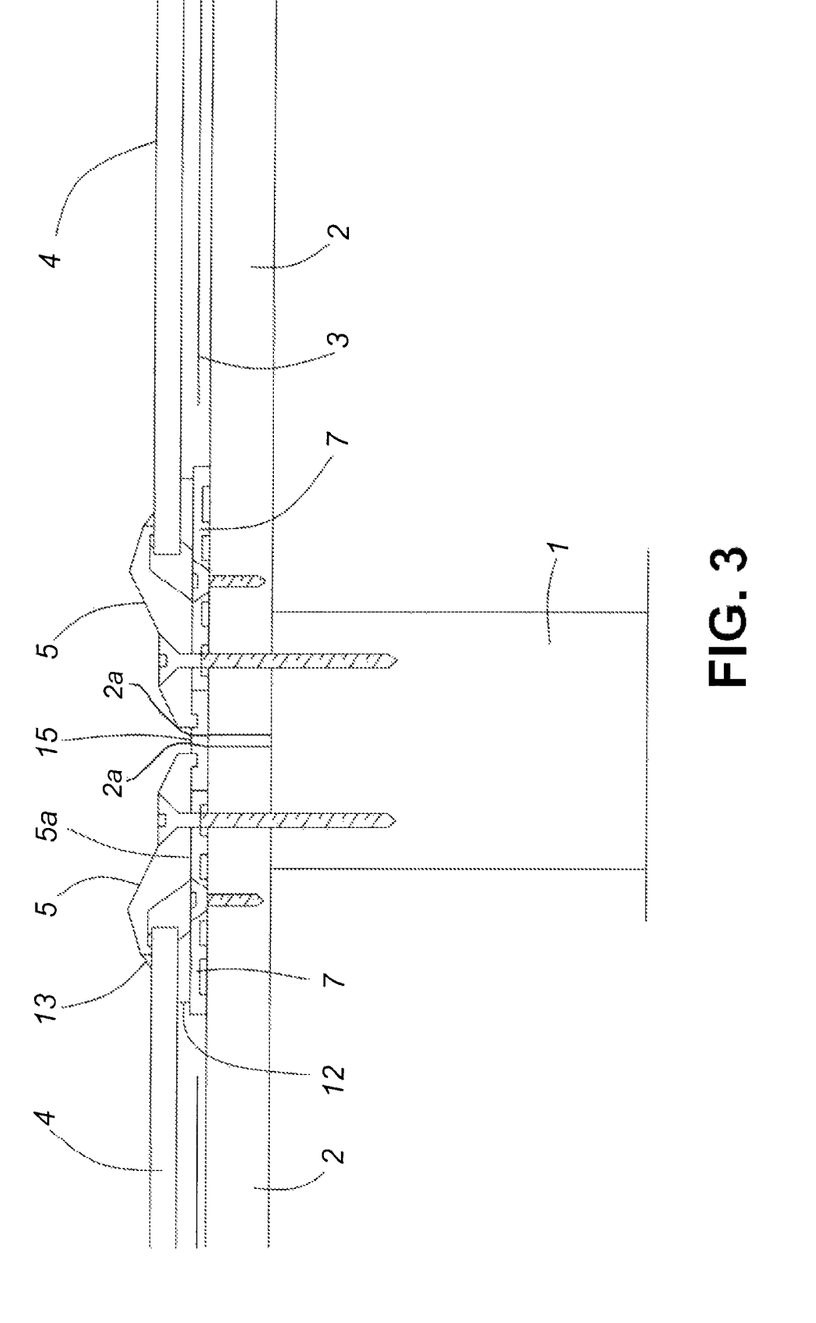
FIG. 3 is a cross section view through abutting sides of a pair of adjacent roof solar panels according to the invention, installed on a roof.

In FIG. 3 there is shown in cross section across abutting sides, a preferred configuration of a pair of adjacent roof solar panels according to the present invention. Thus, instead of a shingle strip 6 covering the joint 14 between the abutting panels (as in FIGS. 2 and 2a), there is a resilient strip 15, preferably water impermeable and preferably made of rubber, mounted over and along the length of such joint with adhesive sealant. The retainer trim 5 is mounted, when the abutting roof solar panels are being installed on the roof, over such resilient strip 15 (as well as the flashing strip 7 as described above).

Figure 4:
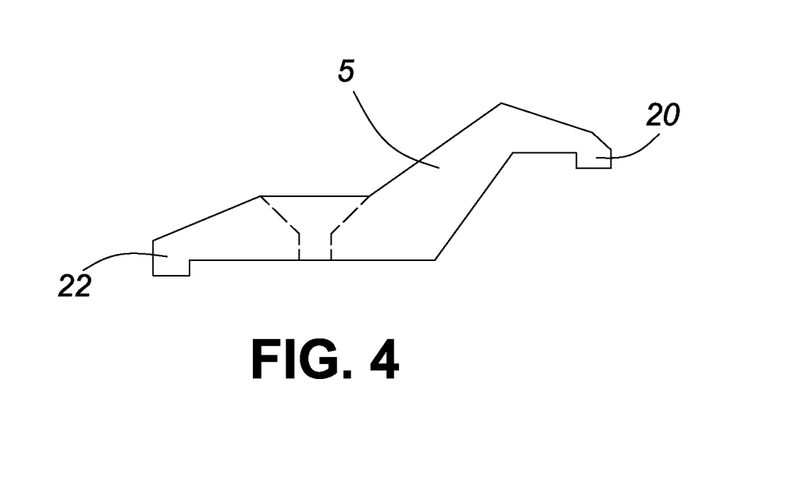
FIG. 4 is a cross section view of a retainer trim component of the invention.

FIG. 4 shows a preferred configuration of the retainer trim 5 for use in the roof solar panel of the present invention. Preferably such retainer trim 5 is made of aluminum. The retainer trim 5 is shown having retainer lip 20 (e.g. 1.5 mm (0.059 inches) wide), adapted for sealing engagement With a top perimeter area of the protective sheet 4 at position 10 (FIGS. 2 and 2a). The retainer trim 5 also has mounting base 5a, configured preferably with flange 22 (e.g. 2mm (0.079 inches) wide) for securing engagement with shingle strip 6 or resilient strip 15. Preferably the mounting base 5a is about 20 mm (0.787inches) wide of the total preferred width of the retainer trim (30 mm (1.181 inches)), and preferably the retainer trim is 10 mm (0.394 inches) high.

Figure 5:
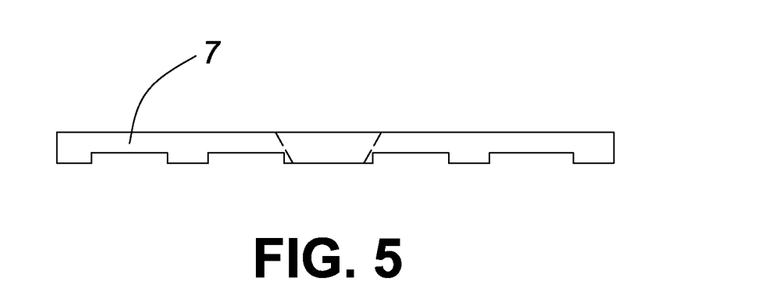
FIG. 5 is a cross section view of a base flashing strip component of the invention.
Figure 6:
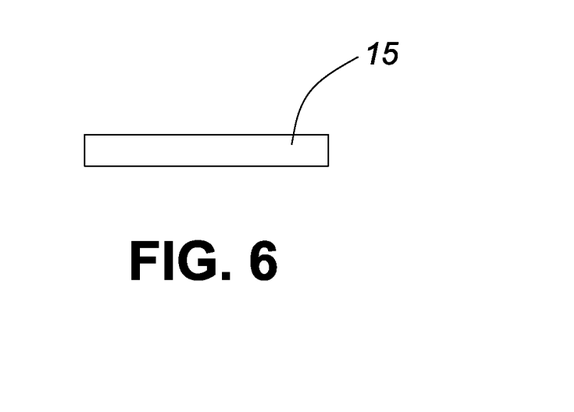
FIG. 6 is a cross section view of a rubber connecting strip component of the invention.

FIG. 5 shows a preferred configuration of the flashing strip 7, which strip is preferably made of aluminum with longitudinal troughs on its underside sheathing-mounting surface and is preferably about 34 mm (1.339 inches) wide and 2 mm (0.079 inches) high. FIG. 6 is a preferred configuration of the resilient strip 6, preferably of made of rubber and about 15mm (0.591 inches) wide, 2 mm (0.079 inches) high.

Figure 7:
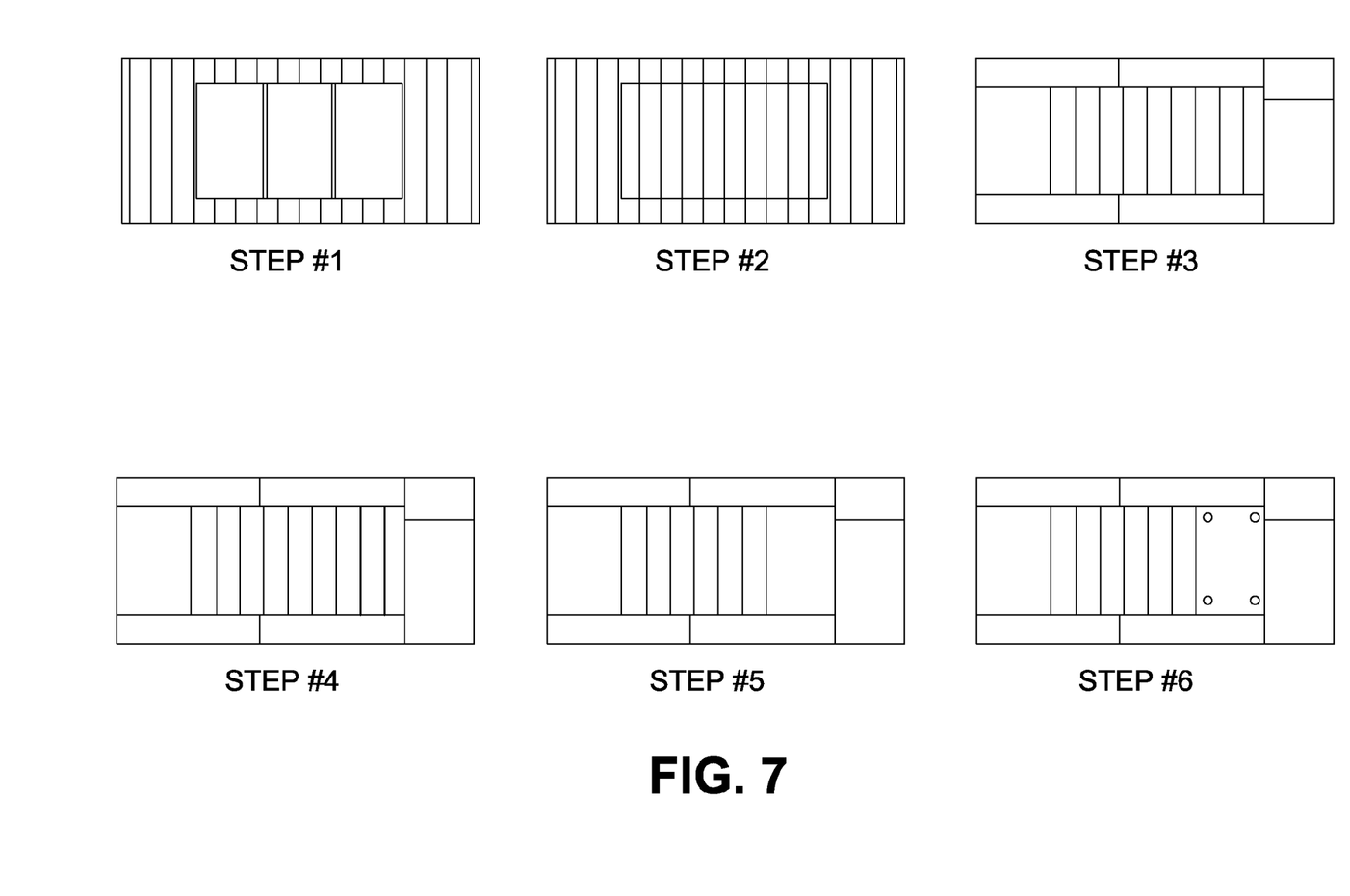
FIG. 7 is a sequence diagram illustrating steps for installing an intermediate roof solar panel on a roof so as to provide an installed roof solar panel, according to the invention.

The inventive method of installation of the subject roof solar panel on a roof is illustrated in FIG. 7. While this illustrates the mounting of three abutting roof solar panels, the process for mounting a single roof solar panel is similar, as will be indicated in the following discussion when appropriate.

Thus, in step 1, the planned configuration of three roof solar panels is shown on a roof section in which the vertical lines represent trusses, a peak of the roof is at the top and bottom edge of the roof is at the bottom. The location of the bottom edge of the roof solar panels between the top and bottom of the roof section is preferably at a distance above the bottom edge of the roof section which is approximately a whole multiple of the height (distance from lower to upper edges) of the finished showing surface of a shingle for the roof This is to provide for a full shingle showing surface in the first row of shingles abutting the lower edge of the retainer trim 5 along the bottom of the roof solar panel. In Step 2, a border for the roof solar panels is marked, as illustrated, on the trusses to ensure correct positioning of the panels to be mounted, In Step 3, regular roof sheathing is mounted onto the trusses, around the marked opening for the roof solar panels. In Step 4, preferred application of 4 mm (0.157 inches) × 4 mm (0,157 inches) silicon silicone adhesive bead to tops of trusses that will be under intermediate areas of the first roof solar panel to be installed is shown. in Steps 5 and 6, mounting of the first solar panel is shown, using regular roof sheathing spacers. Preferably, a screw is installed in each of the four corners of the roof solar panel into the underlying roof trusses, further preferably providing each of such holes with a tapered opening for the screw head, Steps 4-6 are repeated to install the other two roof solar panels. In Step 7, which shows the other two panels also mounted in position, a resilient strip (15 in FIG. 3), preferably of rubber, is mounted along the join between abutting roof solar panels. (This is not applicable to when a single roof solar panel is being installed no such resilient strip is needed in the latter ease.) Preferably, the resilient strip 15 is mounted over silicone sealant applied between the respective edges of adjacent roof solar panels, Also preferably, such resilient strip 15 at an upper end extends about from 12 to 30 cm (4.724to 11.81 inches), most preferably 20 cm (7.87 inches) beyond the upper end of the join between the adjacent roof solar panels onto adjacent roof sheathing, and at a lower end is about 8 cm (3.15 inches) shorter than the lower end of such join (for a shingle to butt against such lower end).

In Step 10, regular shingles are shown installed from the bottom edge of the roof up to the bottom edge of the flashing strip 7 (best shown in FIGS. 8 and 8a), with short extensions between the adjoining roof solar panels so as to butt up against the lower edges of the resilient strips 15. In preparation for installation of the retainer trim 5, preferably silicone sealant is applied around the perimeter areas of all the solar panels, i.e. over the shingle strips 6, the flashing strips 7, the resilient strips 15 and the shingles at the bottom adjacent the flashing strip. Also, preferably roof sealer is applied to all butt joints out 2 inches from the solar panel. In Step 11, the retainer trim is mounted in position over the flashing trim 7, shingles and, for multiple solar panel installation, resilient strip 15. Fasteners, preferably screws and silicone sealer, are then installed through the retainer trim 5, flashing strip 7 and sheathing 2, into the underlying truss 1. Finally, shingling of the roof is performed in which conventional shingles butt up against the retainer strip.

In Step 10, regular shingles are shown installed from the bottom edge of the roof up to the bottom edge of the flashing strip 7 (best shown in FIGS. 8 and 8a), with short extensions between the adjoining roof solar panels so as to butt up against the lower edges of the resilient strips 15. In preparation for installation of the retainer trim 5, preferably silicon sealant is applied around the perimeter areas of all the solar panels, i.e. over the shingle strips 6, the flashing strips 7, the resilient strips 15 and the shingles at the bottom adjacent the flashing strip. Also, preferably roof sealer is applied to all butt joints out 2 inches from the solar panel. In Step 11, the retainer trim is mounted in position over the flashing trim 7, shingles and, for multiple solar panel installation, resilient strip 15. Fasteners, preferably screws and silicon sealer, are then installed through the retainer trim 5, flashing strip 7 and sheathing 2, into the underlying truss 1. Finally, shingling of the roof is performed in which conventional shingles butt up against the retainer strip.

Figure 8:
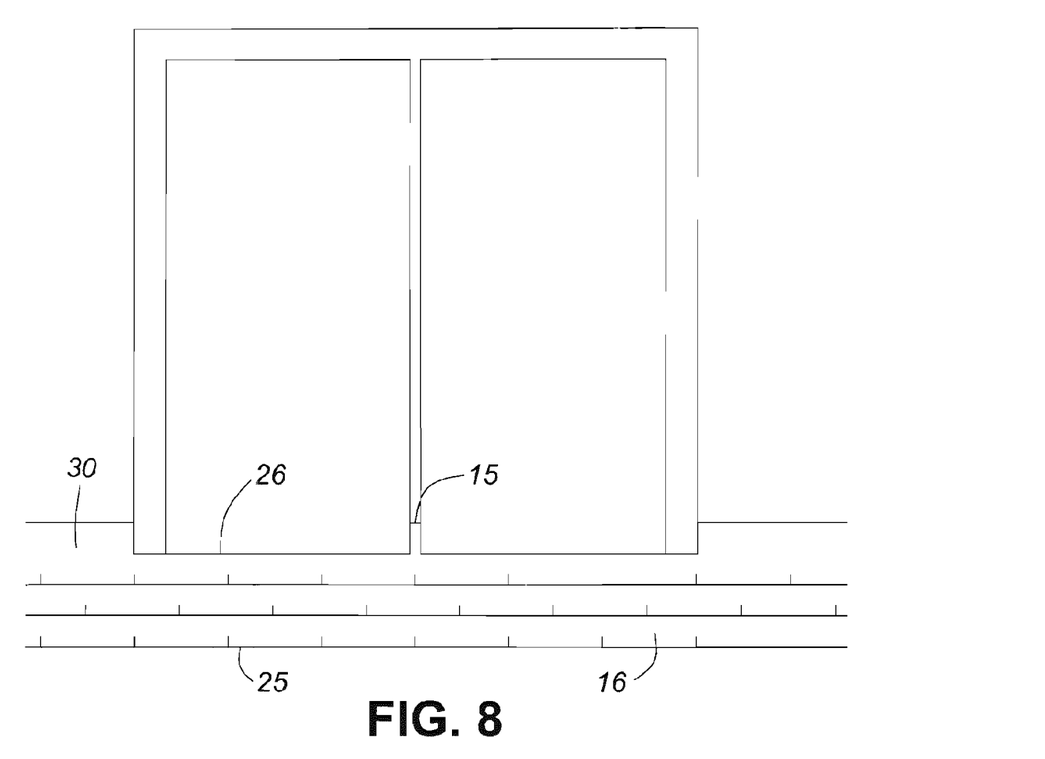
FIG. 8 is a plan view of a pair of adjacent roof solar panels according to the invention, showing particulars of preferred shingle integration along the lower edge of the roof solar panels before installation of the retainer trim component.
Figure 8A:
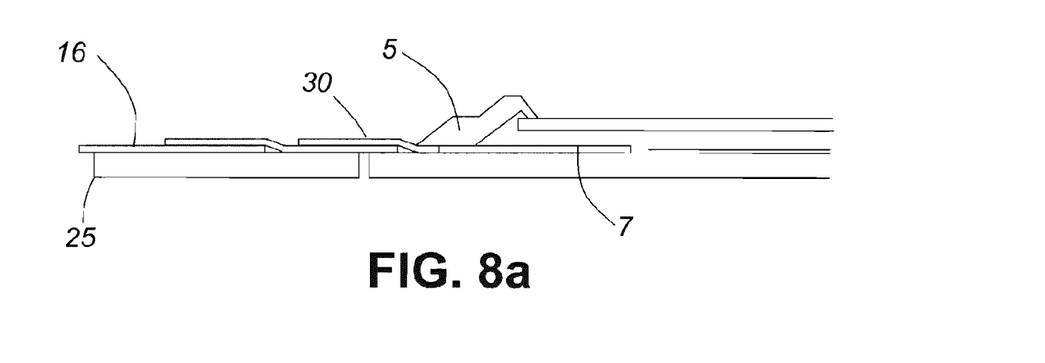
FIG. 8a is a cross section view of the bottom (lower) end of one of the roof solar panels of FIG. 8, after installation of the retainer trim component.

FIG. 8 shows a preferred shingle integration along the lower edge area of a pair of abutting roof solar panels. A normal shingling process is used from the lower edge of the roof 25 upwards to the lower edge of the solar panels 26, the latter which has been preferably pre-arranged to be located from the former at a distance which is an increment of 6 ½' from the former. The lower end of the resilient strip 15, preferably is about 8 mm (0.315 inches) above the lower end 26 of the solar panels. The shingle below said lower end of the resilient strip 15 can be seen between the solar panels where it butts up against said end 15. In FIG. 8a (Which is a schematic representation, not to scale) the lower area of FIG. 8 is shown in cross-section but with the retainer trim 5 in position. The top-most, partial shingle strip 30 has been cut to butt against the lower edge of the flashing strip 7, beneath the retainer trim 5. The first and second shingles from the roof edge 25 are also shown.

In a preferred commercial embodiment of the invention, the roof solar panel is prepared to a pre-installation condition without the retainer strip. This is because, as may be appreciated from the foregoing description of the installation method, the retainer trim can only be installed once the shingle strips 6, and resilient strips 15 if applicable (i.e. for multiple panel installations) have been installed over the abutting edges of the panel and adjacent sheathing. Thus, such pre-installation condition of the subject roof solar panel comprises an important intermediate product that may be sold as such, preferably in kit form with pieces of retainer trim, for later installation on a roof in combination with the retainer trim.

While the foregoing describes most preferred embodiments of the subject invention, a person skilled in the art will appreciate that variations of such embodiments will be feasible and still be within the scope of the teachings herein. Thus, the substitution of different materials (e.g. metals, plastic, adhesives etc.) for those specifically indicated may be expected to occur to such person, and variations in shapes and configurations of the different components involved may be made while sustaining the functions of components actually shown herein, such all being within the intended scope of the present invention.

I claim:

1. A modular roof solar panel installed on a sloping roof, said panel comprising:
    modular roof sheathing having an upper surface and a sheathing perimeter, said sheathing perimeter having an underside mounted on adjacent roof trusses, a topside and a sheathing perimeter edge,
    a flashing strip mounted on said topside of the sheathing perimeter, the flashing strip having inside and outside perimeter edges, said flashing strip set back from the sheathing perimeter edge to provide a shingle mounting surface on a topside of said sheathing,
    an array of photovoltaic cells mounted on the upper surface, said array having an array perimeter inside said flashing strip inside perimeter edge,
    a rigid, transparent protective sheet over the array, said protective sheet mounted on said flashing strip proximate to said flashing strip inside perimeter edge,
    shingles sealingly secured on said shingle mounting surface around the Sheathing perimeter and on a topside perimeter area of adjacent roof sheathing to which said shingles extend,
    a rigid retainer trim which mechanically fastens the shingles and protective sheet to the flashing strip, comprising a mounting base and a retaining lip, said retainer trim mounted at said mounting base on a topside of said shingles over said shingle mounting surface and on a topside of said flashing strip outside where said protective sheet is mounted on said flashing strip, said retaining lip sealed on a topside perimeter of said protective sheet, wherein the retainer trim further comprises fasteners securing the modular roof solar panel to at least one of said roof trusses.

2. The panel of claim 1 wherein the protective sheet comprises glass, low iron glass, or plexiglass.

3. The panel of claim 1 wherein the protective sheet is sealingly mounted onto the flashing strip with urethane and the retaining lip is sealed by a silicone sealer to the topside perimeter of said protective sheet.

4. The panel of claim 1 wherein the roof sheathing comprises 4'×8' non-flammable plywood, or a non-flammable board.

5. The panel of claim 1 wherein the flashing strip and retainer trim are made of aluminum.

6. The panel of claim 1 wherein shingles over adjacent roof sheathing abut the retainer trim.

7. The panel of claim 1 wherein the shingles that are secured on said shingle mounting surface around sides and top areas of said sheathing perimeter are shingle strips.

8. The panel of claim 1 wherein said modular roof sheathing is mounted on a plurality of roof trusses and wherein silicone adhesive is used to secure said sheathing on one or more of said trusses that are not beneath the sheathing perimeter.

9. A kit comprising the modular roof solar panel of claim 1.

10. The kit of claim 9 wherein said kit further comprises shingle strips and mounting hardware.

11. A method of installing the modular roof solar panel according to claim 1 onto the sloping roof, said method comprising:
    selecting an area for mounting of the modular roof solar panel,
    installing roof sheathing on roof trusses around a perimeter of said area,
    mounting the modular roof solar panel onto said area of roof trusses,
    securing shingles over said shingle mounting surface and adjacent roof sheathing,
    sealingly mounting a retainer trim, at the mounting base thereof, on said flashing strip outside where said protective sheet is mounted on said flashing strip and on said shingles secured over said shingle mounting surface, while sealing the retaining lip of said retainer trim onto the topside perimeter of said protective sheet, and securing the modular roof solar panel to at least one of said roof trusses with fasteners extending through the retainer trim.

12. The method of claim 11 further comprising, after mounting of the retainer trim and sealing of the retaining lip, integrating surrounding shingles of adjacent roof sheathing to said shingles on which said retainer trim has been mounted.

13. The method of claim 11 wherein said selecting comprises marking the area, said mounting of the modular roof solar panel comprises using sealing adhesive on a mounting surface of one or more of the trusses, and using screw fasteners through the retainer trim and sheathing perimeter into the trusses.

14. The method of claim 11 wherein said securing of shingles comprises using sealing adhesive on an underside of the shingles, and wherein said sealingly mounting said retainer trim comprises using sealing adhesive between said flashing strip and said shingles, and said mounting base of said retainer trim.

15. The method of claim 11 wherein two or more abutting modular roof solar panels are installed using a connecting strip over, and sealing adhesive between abutting sides of said abutting panels.

16. The method of claim 11 wherein one or more of said shingles are shingle strips, said shingle strips being secured onto said shingle mounting surface along both sides and top of the modular roof solar panel, and wherein other of said shingles are shingles secured onto said shingle mounting surface along a bottom of the modular roof solar panel such that top edges of said other shingles abut against an outside edge of said flashing strip.

17. The method of claim 16 wherein said shingle strips are prepared from shingles by cutting away at least part of a showing surface of said shingles.

* * * * *